Sept. 1, 1936. C. E. MASON Re. 20,092
CONTROL MECHANISM
Original Filed Sept. 15, 1930
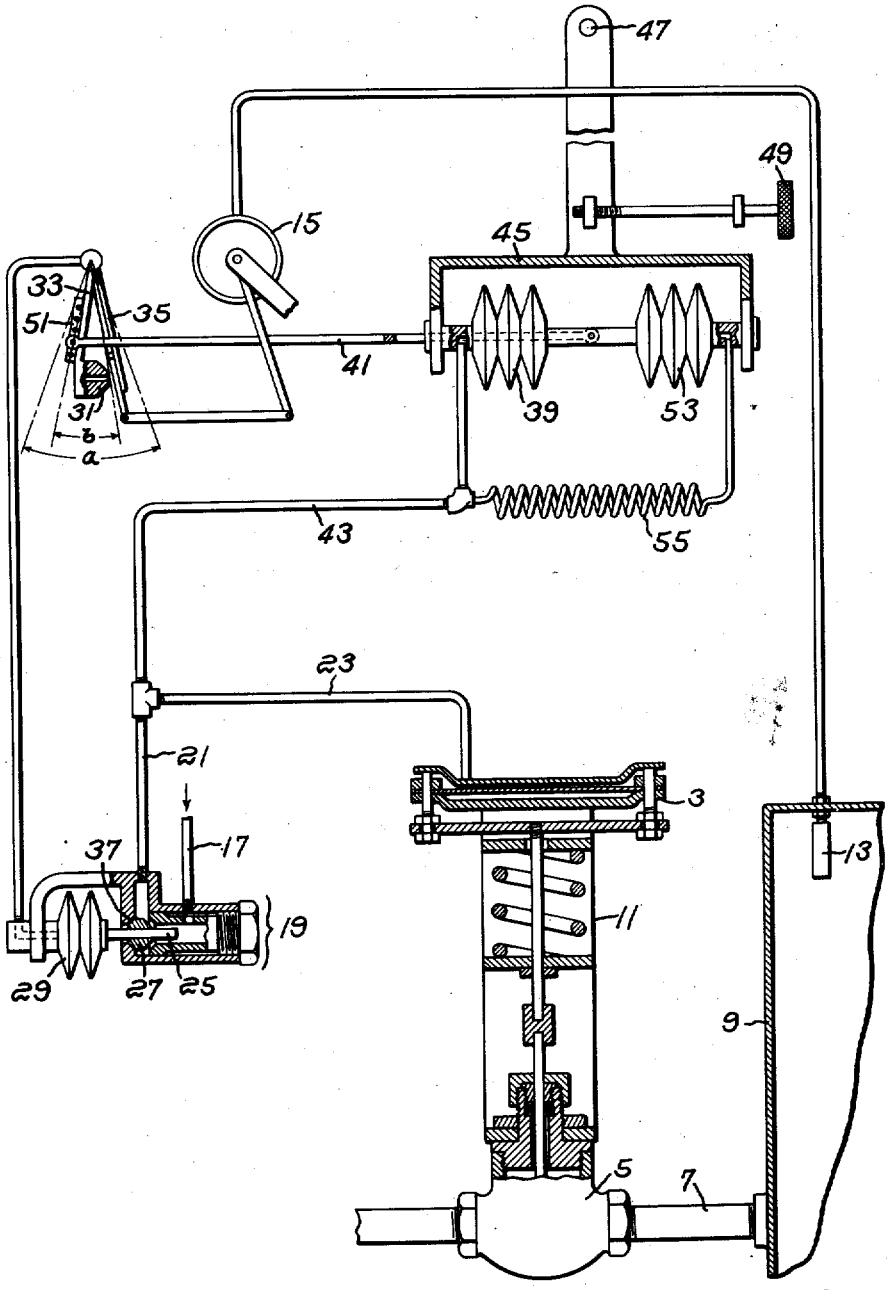
Inventor:
Clesson E. Mason,
by
Emery, Booth, Varney & Townsend Att'ys.

UNITED STATES PATENT OFFICE 20,092

CONTROL MECHANISM

Cleason E. Mason, Foxboro, Mass., assignor to The Foxboro Company, Foxboro, Mass., a corporation of Massachusetts Original No. 1,897,135, dated February 14, 1933, Serial No. 482,127, September 15, 1930. Application for reissue February 11, 1935, Serial No. 6,087

25 Claims. (Cl. 236—82)

This invention relates to control mechanisms of the kind which control the application of some force responsively to the fluctuations of a variable condition, usually to maintain the value thereof constant. The object of the invention is to provide a mechanism permitting accurate control of such a variable condition.

A common application of mechanisms of the kind referred to is the control of the flow of a heating fluid, such as steam, to a place of utilization, and for convenience I have herein disclosed as a specific example of my invention a pneumatically operated and thermostatically governed control mechanism for operating a motor which actuates a valve in a steam line. This illustrative embodiment of my invention will be well understood from the following description taken in connection with the accompanying drawing which represents diagrammatically a steam heating system and controlling mechanism therefor, parts being broken away and parts in section.

Referring to the drawing, I have therein shown a diaphragm motor 3 for actuating a valve 5 in a pipe line 7 through which steam is supplied to a tank 9. In this instance pressure fluid delivered to the motor opens the valve against the force of its spring 11. A thermometer bulb 13 is received in the tank and the temperature therein is measured by a suitable responsive device, as, for instance, the helical Bourdon tube 15 like that shown in the patent to Bristol 1,195,334, dated August 22, 1916, in communication with the bulb.

The mechanism which I am about to describe may be supposed to maintain a constant temperature in the interior of the tank 9. For this purpose the supply of pressure fluid to the servomotor 3 is controlled in accordance with the temperature in the tank as measured by the thermometric device 15 by a mechanism of the supply and waste valve type. Fluid under pressure, such as compressed air, supplied through pipe 17 passes through control head 19 and through pipes 21 and 23 to the motor, the parts being in the position illustrated. Pressure fluid may also bleed through hollow stem 25 of the double valve 27 supported by the diaphragms 29 and exhaust to atmosphere through a "nozzle" port 31, herein provided in the adjustably swinging arm or nozzle bracket 33. The port constitutes one element of a control couple, the other element of which is a valve for said port which herein takes the form of a swinging arm or "flapper" 35 operated by the helical tube 15. As the temperature increases, the flapper 35 swings towards the left and finally closes against the nozzle, closing port 31. This permits pressure to build up in diaphragms 29, shifting the double valve 27 towards the right, cutting off communication between the pipes 17 and 21 and at the same time opening exhaust port 37 in the control head permitting the pressure in the diaphragm motor 3 to exhaust and the valve 5 to close, shutting off the supply of steam. The mechanism so far described is in principle like that described in the patent to Johnson 542,733, dated July 16, 1896, and in detailed construction may be and preferably is similar to that shown in the patent to Dixon 1,582,868, dated April 27, 1926.

The approach and recession of the nozzle 31 and flapper 35 constituting the control couple govern the pressure in the system and consequently the position of controlled valve 5. The position of the elements of the couple is governed by the temperature in the tank 9 which herein governs the movement of flapper 35. I also provide means controlling the couple cooperatively with the temperature and responsively to the pressure in the system. I herein show a set of diaphragms 39 constituting a pressure-fluid-operated motor, the movable (right hand) wall of this set of diaphragms being connected as by means of the rod 41 to nozzle bracket 33, (shown also connected to left hand wall diaphragm 53 which for the present are open to atmospheric pressure), and this diaphragm chamber 39 is subjected internally to the controlled pressure of the system through pipe 43. Herein the diaphragms 39 are supported on a frame 45 mounted for adjustment about pivot 47 as by means of an adjusting screw 49, this adjustment effecting an adjustment of the position of the nozzle 31 depending upon the fluid pressure in diaphragms 39.

Merely in order to permit the clearness which is found in reference to a specific example, let us suppose that the temperature which it is desired to maintain by means of the mechanism to be 80°. The thermometric tube 15 is adapted to swing flapper 35 through a range *a* in the drawing, moving it towards the left or clockwise as the temperature increases. The nozzle 31 may be set in a plane corresponding to the 80° position of the flapper in range *a* by means of adjusting screw 49, for instance, which is the left hand boundary of the range *b*, atmospheric pressure existing in diaphragms 39. The position of 49 remains unchanged throughout this discussion. Now, when normal full supply pressure fluid flows, diaphragms 39 will be expanded and the nozzle will be moved over to the right hand boundary of range *b*, as shown in the drawing, representing, let us say, 70° in range *a*, the flapper being to the right of range *b*. The tank being cold, flapper 35 lies to the right of range *b*, port 31 is uncovered, pressure fluid flows to motor 3, valve 5 is wide open and the process heats up rapidly to 70°. Flapper 35 then closes exhaust port 31 and pressure in the system is partially exhausted. This means that the pressure in motor 3 is partially exhausted. The pressure falls also in diaphragms 39, nozzle bracket 33 shifting somewhat to the left uncovering port 31. By this means as the flapper moves to the left, a gradual diminishing pressure is maintained in diaphragms 39 as in motor 3 until nozzle and flapper have reached the left hand or 80° position which corresponds to zero pressure in motor 3. It will be noted that while the thermometrically responsive device 35 was outside of the range *b*, a large potential was maintained to supply heat to the process and to bring about a variation in the temperature thereof. Within the range *b* and with the temperature rising, however, the rate of flow is gradually diminished and excess heating is thereby avoided.

The combined results of the reactions and counterreactions as governed by the thermometric device 15 and cooperating motor device 39 maintain the elements of the control couple (nozzle 31 and flapper 35) always tangent when the flapper 35 is within range *b*, and the resulting average pressure in diaphragms 39 and in the system is always directly proportional to the position of the flapper within that range.

The magnitude of range *b* may be adjusted by connecting rod 41 to nozzle bracket 33 at different distances from its pivotal center as herein graphically shown by the series of openings 51 for attachment of the rod.

Many industrial processes require a continuous supply of heat to maintain a given temperature. Considering the apparatus as so far described as applied to such a process let us suppose, for example, that the nozzle 31 as positioned as a result of the interaction with flapper 35 as above described has taken a position corresponding to 75°, for example, that valve 5 is substantially one-half open in a position dependent on the resultant pressure in motor 3 and that the heat supplied is just sufficient to balance the heat losses of the process to maintain the temperature in tank 9 substantially at 75°. Evidently under such circumstances the control operation becomes balanced and the tank does not continue to heat up to the desired definite temperature of 80°. The temperature at which the balance just described would take place would depend on the demands of the process at the time.

In order, therefore, to have a definite control point I prefer to utilize in connection with the mechanism hitherto described a mechanism operating in opposition to the pressure-fluid-operated motor diaphragms 39 but having a retarded action. I have herein shown a set of diaphragms 53 mounted on the frame 45 and arranged to counteract the diaphragms 39. The controlled pressure in the system may be transmitted to the interior of the diaphragms 53 through a restricted connection 55, herein shown as consisting of a length of substantially capillary tubing which provides for a retarded flow or slow seepage of pressure fluid thereto to permit only a gradual change in the pressure conditions in the diaphragms 53 consequent on a change of the controlled pressure in the rest of the system.

The mechanical construction of the sets of diaphragms 39 and 53 so biases the parts that with the pressures therein equal the nozzle 31 is in a position corresponding to the 80° position of the flapper in range *a*. Assuming the pressure to be admitted to the system and the flapper to be to the right of range *b*, however, diaphragms 39 immediately expand, shifting the nozzle to the right hand position.

Now, assuming the parts to be operating in the manner hitherto described and a reduced pressure maintained in the system corresponding, say, to a 75° position of the nozzle within range *a* and the temperature in the tank rising, if the process does not heat up sufficiently rapidly to cause flapper 35 to continue to be moved towards the left to the 80° position, the previously relatively low pressure in diaphragms 53 compared with pressure in diaphragms 39 slowly builds up through the restricted connection 55. This increased pressure in 53 acting through connecting rod 41 shifts nozzle bracket 33 to the left tending to open port 31 and thus increasing the pressure in the system and opening valve 5 wider to provide a more rapid flow of heating medium. It is evident that the temperature will tend to rise.

The operation of the mechanism just described provides for throttling the valve as we approach the control point so that it will bring the temperature to the definite control point 80° substantially without hunting. The parts 53 and 55 constitute a sort of balancing mechanism, establishing a control balance at a definite temperature.

The action of the device omitting the parts 53 and 55 is to cause the control balance to occupy varying positions in range *b* which is equivalent to occupying varying positions in range *a* since range *b* is definitely located in range *a*. Thus if the pressure maintained in the system is used directly or indirectly to operate a controlled valve (as 5) there must be varying positions of the balance within range *a* to determine varying positions of the control valve. The use of the counteracting mechanism 53 with its retarding connection 55 still permits the balance 33 to occur at varying positions in range *b* and thus establish the required pressure in the system, but there is always a tendency to establish equal pressures in diaphragms 39 and 53 through the restricted connection 55 and thus the mechanism eventually always returns the control balance to a definite position in range *a* regardless of its required position in range *b*. In effect the complete mechanism illustrated sets range *b* in varying positions within range *a* instead of setting the control balance in these varying positions. This combination permits a definite control point regardless of the varying demands of the process being controlled.

An understanding of the operation of the mechanism may be facilitated by a further discussion.

In various mechanisms embodying the principle of the Johnson Patent 542,733 above referred to, the action of the controlled valve corresponding to valve 5 herein is what may be called "open and shut", that is, (in a direct heating process) when the flapper is away from the nozzle, the valve is wide open, and when it is against the nozzle, the valve is completely closed. This type of operation produces undesirable variations in many control problems. A purpose of the present apparatus is to reduce these variations to a point where their effect is negligible.

In the construction shown let us first consider the mechanism without diaphragms 53. That is, we may assume connection 55 plugged and diaphragms 53 open to atmosphere. Let us further consider that the process has been brought to a temperature at which flapper 35 has reached the right hand boundary of range *b*, valve 5 being wide open and full control pressure in the system. This pressure distends diaphragms 39, positioning nozzle 31 at the right of range *b*. The nozzle meets the flapper and diaphragm 29 tends to distend, shutting off the supply of air from 17. At the same time the pressure in diphragms 39 tends to exhaust through 43 and diaphragms 39 relax, moving the nozzle away from the flapper. The tendency is always to maintain the nozzle tangent to the flapper.

Now if, as explained, the diaphragms 39 are so designed that the highest pressure therein will maintain the nozzle at the right of range *b* and zero pressure at the left of *b*, evidently for any intermediate pressure the nozzle has an intermediate position. Motor 3 being so designed that full pressure therein fully opens valve 5 and zero pressure closes it, to each intermediate pressure corresponds a definite position of the valve stem, a particular area of valve opening and, with a constant pressure differential across the valve, a particular flow. Thus to any given position of the nozzle 31, there corresponds a particular position of valve or effective valve opening. In operation the flapper positions the nozzle which positions the valve.

Now if valve 5 is of proper size adequately to supply the demands of the process, a particular position of the valve corresponds to the demands of the process. However, this particular position can be maintained only by a particular position of nozzle 31. Inasmuch as in normal operation nozzle 31 is maintained tangent to flapper 35 at all times, to any position of the flapper under control of the temperature measuring element 15 there corresponds a definite position of the valve. Now if the demands of the process vary, a change in temperature follows, corresponding to an absorption or release of heat energy. But since the tendency is to maintain nozzle 31 tangent to flapper 35 and the flapper moves as the temperature or energy demand changes and further since positions of valve 5 correspond to positions of nozzle 31, the valve 5 cannot change its position with resultant change in energy input any faster than the process changes, but the instrument can follow such a change within a reasonable degree. The result is a damping effect tending to eliminate hunting of the valve.

By varying the size of range *b* the range of application of this damping effect may be varied. In many cases the range may be large which in turn means that a condition of equilibrium with the energy input just balancing consumption or heat absorption without change in temperature may be anywhere within range *b* depending upon the variation in the demands of the system.

This variable location of the control point, as this position of control balance or equilibrium may be called, is usually or frequently undesirable. In order to retain the damping characteristics of the construction described and secure a substantially constant control point so that the process will be in control balance at the desired temperature I utilize diaphragms 53 opposing diaphragms 39 and fed through restriction 55. The nozzle 31 still tends to assume a position tangent to the flapper 35. So long as the flapper is to the right of the 80° position of range *a* as marked in Fig. 1, the pressure in 39 exceeds the pressure in 53. This differential pressure across the restriction tends to create a flow into diaphragms 53. To any position of the nozzle there corresponds a definite value of the differential. As flapper 35 moves toward the 80° position the difference in pressure between diaphragms 39 and 53 decreases, approaching zero as flapper 35 approaches the 80° position in range *a*.

In the event that the difference in pressure decreases at the same rate as the pressure in 53 increases, the fluid pressure in 39 will remain constant. Such a condition could only exist when flapper 35 approaches the 80° position at a rate that approaches zero as the flapper approaches the 80° position because the rate of change of pressure in 53 approaches zero as the fluid pressures in 39 and 53 approach equalization.

In the event that the difference in fluid pressures decreases faster than the pressure in 53 increases, the actual fluid pressure in 39 decreases and tends to bring the control operation into the condition described in the previous paragraph so that the control operation becomes balanced when the flapper 35 reaches the 80° position.

In case a process lag causes flapper 35 to swing beyond the 80° position, the fluid pressure in 39 becomes less than the pressure in 53 and the difference in pressures is again proportional to the deviation of the temperature from 80°. Under these conditions the flow of the pressure fluid through 55 is reversed and fluid pressure in 39 and servomotor 3 will continue to reduce until a reduced flow of heating medium causes flapper 35 to return toward the 80° position. Under these conditions the fluid pressure reactions in diaphragms 39 are identical to those described above, but are in the opposite direction. The reactions of the control mechanism are to establish a state of control balance with flapper 35 at the 80° position regardless of the required fluid pressure in diaphragms 39 and servomotor 3.

In view of the operation of the mechanism just described the construction provides for throttling the valve in such a way that the temperature approaches the control point with a decreasing rate of change as the control point is reached. This action produces a steady flow of controlled medium always substantially equal to the demand for the same and thus eliminates the common difficulty known as "over-controlling" or "hunting". This action can conveniently be explained by mathematical analysis as follows:—

Assume the temperature scale to be uniformly divided;

Let T be any temperature within range *b*;

Let $T_c$ be the position corresponding to the 80° on *a*, or the set point of the control;

Let $P_1$ be the pressure in diaphragms 39;

Let $P_2$ be the pressure in bellows 53;

Now by construction $$(1) \qquad (T-T_c)=(P_1-P_2)K$$

where K is a constant depending on the number of the temperature divisions of *b*.

Now we may obtain an expression showing the rate of change by differentiating with respect to the variable time, denoted by *t*. Hence $$(2) \qquad \frac{d}{dt}(T-T_c)=\frac{d}{dt}(P_1-P_2)K$$

Since $T_c$ is a constant we may write $$(3)\qquad \frac{dT}{dt}=\frac{d}{dt}(P_1-P_2)K=\frac{dP_1K}{dt}-\frac{dP_2K}{dt}$$

By construction $$(4)\qquad \frac{dP_2}{dt}=(P_1-P_2)K_1$$

where $K_1$ is a constant depending on the volume of 53 and the restriction of 55. Expressed in words, this equation states that the rate of change in pressure in 53 is dependent on the restriction of the supply passage thereto and the volume of 53 and the differential head or effective pressure tending to cause flow through the passage.

Substituting the value of $P_1-P_2$ given by (1) in this Equation (4) we get $$(5)\qquad \frac{dP_2}{dt}=(T-T_c)\frac{K_1}{K}$$

But from (3)

$$(6)\qquad \frac{dP_1}{dt}=\frac{d}{dt}\left(\frac{T}{K}\right)+\frac{dP_2}{dt}$$

Substituting in this equation the value for $$\frac{dP_2}{dt}$$

given by (5), we get $$(7)\qquad \frac{dP_1}{dt}=\frac{d}{dt}\left(\frac{T}{K}\right)+(T-T_c)\frac{K_1}{K}$$

Interpreting this result, we see that the rate of change in pressure in the valve motor is linearly proportional to the rate of change of temperature plus a value expressed as a constant multiple of the difference between the actual temperature and the set point of the control. The first term, $$\frac{d}{dt}\left(\frac{T}{K}\right)$$

represents the damping action of the device while the second term, $$(T-T_c)\frac{K_1}{K}$$

represents the effect of that construction tending to return the control point to the set point $T_c$ at a rate which decreases as T approaches $T_c$. The combined result secures a definite set point without injurious hunting.

Having an expression for the rate of change we may integrate to determine the change over a period of time.

$$(5)\qquad \frac{dP_2}{dt}=(T-T_c)\frac{K_1}{K}$$

This may be written:—

$$(8)\qquad dP_2=(T-T_c)\frac{K_1}{K}dt$$

Now integrating the first member between suitable pressure values and the second member between corresponding time values, we obtain $$(9)\qquad \int_{p1}^{p2}dP_2=\int_{t1}^{t2}(T-T_c)\frac{K_1}{K}dt=\frac{K_1}{K}\int_{t1}^{t2}(T=T_c)dt$$

Equation (9) expresses the difference in pressures in diaphragms 53 between the beginning and end of a time interval. Hence we see that the change in pressure in 53 is proportional to the integral of the deviation in temperature relative to time. Assuming that the process is in a condition of equilibrium with the pressures in 39 and 53 balanced, a deviation of the temperature usually corresponds to a change in the energy demands of the process. Our equation shows that the pressure in diaphragms 53 will change in direct proportion to this measure of energy demands. Since direct flow between diaphragm 39 and supply line 43 is easier than flow between diaphragms 53 to 39 through restriction 55, evidently the pressure in 39 will change to balance this changed pressure in 53. To this new pressure, $P_1$, in 39 corresponds a definite setting of the valve. The change in this pressure and the change in valve setting is therefore determined by the integral of the temperature variation and is no more and no less than the changed condition that the process demanded. A definite and determined control is thus provided for and hunting is obviated.

To suit the demands of different processes the resistance at 55 may be suitably chosen to determine the value of $K_1$, while the provision of the adjustment at 51 provides for varying the value of K.

I have in this description referred specifically to the control of temperature. In view of the emphasis thus placed on temperature, I may properly point out that the mechanism may control responsively to other variables, the value of which may be changed by varying the input of energy. In particular in the embodiment shown, temperature is manifested by a change of pressure in helical tube 15 and essentially the same device might control, for instance, pressure as such, or flow, or level as manifested by a differential pressure.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A fluid-pressure-operated control mechanism of the supply and waste valve type comprising a control couple, one element of which comprises a nozzle for directing a jet of air and the other a valve for said nozzle, the relative approach and recession of said elements governing the pressure in the system, means for positioning one of said elements responsively to the values of a variable condition which is affected by the controlled action, and means proportionally responsive to the controlled pressure for positioning the other causing it to follow the movement of the element positioned responsive to the values of the variable condition.

2. A fluid-pressure-operated control mechanism of the supply and waste valve type comprising a control couple, one element of which affords a port to atmosphere and the other a valve for said port, the relative approach and recession of said elements governing the pressure in the system, and means conjointly to control the relative position of said elements comprising a device responsive to the fluctuations of a variable condition which is affected by the controlled action, and a chamber subject to the controlled pressure having a part movable responsively thereto, said chamber being adjustably movable as a whole and by such adjustment effecting movement and adjustment of one of said elements relative to the other.

3. A fluid-pressure-operated control mechanism of the supply and waste valve type comprising a control couple, one element of which affords a port to atmosphere and the other a valve for said port, the relative approach and recession of said elements governing the pressure in the system, and means conjointly controlling the relative position of said elements comprising, first, a device responsive to the fluctuations of a variable which is affected by the controlled action and, second, a pair of oppositely-acting pressure-operated motors, and means providing for free communication of the controlled pressure to and from one such motor and for retarded communication thereof to and from the other.

4. An elastic fluid-pressure-operated control mechanism of the supply and waste valve type comprising an elastic fluid pressure system, a control couple, one element of which affords a port to atmosphere and the other a valve for said port, the relative positions of said elements governing the pressure in the system, means responsive to the values of a variable condition which is affected by the controlled action for relatively moving said elements, means responsive to the value of the pressure in the system to effect a relative movement of said elements in opposite sense, and retarded means simultaneously acting to effect a relative movement of said elements in the original sense.

5. An elastic fluid-pressure-operated control mechanism of the supply and waste valve type comprising a control couple, one element of which affords a port to atmosphere and the other a valve for said port, the relative approach and recession of said elements governing the pressure in the system, means responsive to the fluctuations of a variable condition which is affected by the controlled action for relatively moving said elements, a fluid-pressure-operated motor proportionally responsive to the controlled pressure to effect a relative movement in opposite sense and delayed action motor means for counteracting the motor.

6. In a control mechanism of the type wherein the elements of a control couple by their relative approach and recession govern the application of a motive force comprising an elastic fluid to a servo-motor, means responsive to the fluctuations of a variable which is affected by the controlled action for relatively moving said elements, means responsive to a control operation to effect a movement in opposite sense and retarded means subsequently acting to effect a movement in the original sense as a part of the same control operation.

7. In a control mechanism of the type wherein the elements of a control couple by their relative approach and recession govern the application of a motive force comprising an elastic fluid to a servo-motor, means responsive to the fluctuations of a variable which is affected by the controlled action for relatively moving said elements, means responsive to a control operation to effect a movement in opposite sense and delayed action mechanism acting simultaneously to counteract said last-mentioned means as a part of the same control operation.

8. In combination with a valve governing the flow of fluid to a locus and an operating motor therefor, a source of motive power for operating said motor, the control mechanism comprising a control couple, one element of which comprises a nozzle for directing a jet of air and the other a valve for said nozzle, the relative positions of the elements of which govern the supply of motive power to the motor, means responsive to a variable which is affected by the flow of fluid for positioning the one element, a motor device responsive proportionally to the supply of power for normally moving the second element to follow the motion of the one, and the position of the valve being a function of the relative positions of the said elements.

9. The combination of claim 8 wherein adjusting means is provided for determining the relation to said first element of the range of movement of said second element under control of said motor device.

10. The combination of claim 8 wherein the valve-operating motor is elastic fluid pressure-operated, said control mechanism is of the supply and waste type and said motor device is responsive to the operating pressure.

11. In combination with a valve governing the flow of fluid to a locus and an operating motor therefor, the control mechanism comprising a control couple, the relative approach and recession of the elements of which govern the supply of motive power to the motor, means responsive to a variable which is affected by the flow of fluid for positioning one element, a motor device responsive to the supply of power for normally moving the second element to follow the motion of the one, the position of the valve being a function of the relative positions of the elements, and a second motor device opposing the action of the first, the rate of change of condition of this second device being determined by the deviation of the first from the normal state of equilibrium.

12. In combination with a valve governing the flow of fluid to a locus and an operating motor therefor, the control mechanism comprising a control couple, the relative approach and recession of the elements of which govern the supply of motive power to the motor, means responsive to a variable which is affected by the flow of fluid for positioning one element, a motor device responsive to the supply of power for normally moving the second element to follow the motion of the one, the position of the valve being a function of the relative positions of the elements, and a second motor device opposing the action of the first, the rate of change of condition of this second device having a linear relation to the deviation of the first from the normal state of equilibrium.

13. In combination with a valve governing the flow of fluid to a locus and a pressure-fluid-operated motor for operating the same, the fluid-pressure-operated control mechanism of the supply and waste type comprising a control couple, the approach and recession of the elements of which govern the supply of fluid to the motor, means responsive to a variable which is affected by the flow of fluid for positioning one element, a motor device responsive to the controlled pressure for normally moving the second element to follow the motions of the one, the position of the valve being determined by the relative positions of the elements, and a second device responsive to the controlled pressure at a rate determined by the deviation of the first from the normal state of equilibrium opposing the motion of the first.

14. In combination with a valve governing the flow of fluid to a locus and a pressure-fluid-operated motor for operating the same, the fluid-pressure-operated control mechanism of the supply and waste type comprising a control couple, the approach and recession of the elements of which govern the supply of fluid to the motor, means responsive to a variable which is affected by the flow of fluid for positioning one element, a motor device responsive to the controlled pressure for normally moving the second element to follow the motions of the one, the position of the valve being determined by the relative positions of the elements, and a second pressure-responsive device opposing the motion of the first, there being retarded means for transfer of fluid between the two.

15. In combination with a valve governing the flow of fluid to a locus and a pressure-fluid-operated motor for operating the same, the fluid-pressure-operated control mechanism of the supply and waste type comprising a control couple, the approach and recession of the elements of which govern the supply of fluid to the motor, means responsive to a variable which is affected by the flow of fluid for positioning one element, a motor device responsive to the controlled pressure for normally moving the second element to follow the motions of the one, the position of the valve being determined by the relative positions of the elements, and a second device responsive to the controlled pressure at a rate determined by the deviation of the first from the normal state of equilibrium opposing the motion of the first, there being adjusting means for determining the relation to said first element of the movement of said second element under control of said devices.

16. In combination with a valve governing the flow of fluid to a locus and an operating motor therefor, control mechanism comprising a control couple, the relative approach and recession of the elements of which govern the supply of motive power to the motor, means responsive to a variable which is affected by the flow of fluid for positioning one element, a motor device responsive to the supply of power for normally moving the second element to follow the motions of the one, the position of the valve being a function of the relative positions of the elements, and a second motor device opposing the action of the first, the rate of change of condition of this second device being determined by the deviation of the first from the normal state of equilibrium, there being adjusting means for locating the position of controlled equilibrium of the device within the range of the first element.

17. A fluid pressure operated control mechanism including a control couple of the supply and waste valve type components of which comprise a supply of elastic fluid, an element which affords a port, and an element which forms a valve for said port, the relationship between said components governing the pressure in the couple, means proportionally responsive to the fluctuations of a variable condition which is affected by the controlled action for changing the relationship of said components, means responsive to the change to effect a correction tending to reduce the said change, and means operative by the change to make further correction in opposition to the correction effected by said last-named means to insure return of said variable condition to a predetermined value.

18. In control apparatus for controlling a condition to maintain it at a desired control point by varying the application of an agent influencing the condition, auxiliary means for controlling the agent, motive power for operating said auxiliary means and means for controlling said motive power to supply power continuously to said auxiliary means, said means comprising first means proportionally responsive to the value of the condition and second means movable to conditions of unbalance by change in the application of said agent and returnable to balanced condition along a predetermined asymptotic curve, the amount of power supplied changing responsively to the difference between the rate of change of the first means and the rate of change of said second means.

19. Control apparatus for controlling a process having a variable condition to be maintained substantially at a control point, comprising means responsive to a variable force for regulating flow of energy affecting said process in proportional correspondence with said force, apparatus for governing said force including first control means variable in characteristic in proportional response to said variable condition, second control means variable in characteristic in immediate and continuous proportional correspondence with the value of said force, third control means variable in characteristic in proportional correspondence with the value of said force, fourth control means immediately operative upon change of the value of said force to cause said third means to approach correspondence with the value of said force at a rate conforming with a predetermined asymptotic curve, fifth control means for governing said force operatively to coordinate said first, second and third control means and variable in characteristic in substantially proportional response to the value of the characteristic of said first control means and to the difference of the values of the characteristics of said second and third control means.

20. Control apparatus for controlling a process having a variable condition to be maintained substantially at a control point comprising means responsive to a variable force for regulating flow of energy affecting said process in proportional correspondence with said force, apparatus for governing said force including first control means changeable in characteristic in substantially proportional response to said variable condition, second control means changeable in characteristic in immediate and continuous proportional correspondence with the value of said force, third control means operative upon change of the value of said force to change in characteristic in a direction toward correspondence with the value of said force at a rate conforming to a predetermined asymptotic curve, fourth control means for governing said force operatively to coordinate said first, second and third control means and changeable in characteristic at a rate proportional to the algebraic sum of the rate of change of the value of the characteristic of said first control means and the difference of the rates of change of the values of the characteristics of said second and third control means.

21. Control apparatus for controlling a process having a variable condition to be maintained substantially at a control point comprising means responsive to a variable force for regulating flow of energy affecting said process in proportional correspondence with said force, apparatus for governing said force including first control means changeable in characteristic in substantially proportional response to said variable condition, second control means changeable in characteristic in immediate and continuous proportional correspondence with the value of said force, third control means operative upon change of the value of said force to change in characteristic in a direction toward correspondence with the value of said force at a rate conforming to a predetermined asymptotic curve, the control effect of said third control means acting in opposition to the control effect of said second control means, fourth control means for governing said force proportionally responsive to the characteristic of said first means and to the resultant control effect of said second and third control means.

22. Control apparatus for controlling a process having a varying demand, and a variable condition to be maintained substantially at a control point comprising means for regulating flow of energy affecting said process in proportional correspondence with a variable force, apparatus for governing said force including first control means proportionally responsive to said variable condition, second control means movable in immediate proportional correspondence with change in value of said force, third control means counteracting the second control means and movable upon change of value of said force into correspondence therewith at a rate conforming to a predetermined asymptotic curve, fourth control means for governing said force changeable in characteristic in proportional response to said first control means and to the resultant positions of said second and third control means.

23. Control apparatus for controlling a process having a variable condition to be maintained substantially at a control point comprising means for regulating flow of energy affecting said process in proportional correspondence with a variable force, apparatus for governing said force including first control means proportionally responsive to said variable condition, second control means having free communication with said force and changeable in characteristic in immediate and proportional correspondence with change in the value of said force, third control means having restricted communication with said force and changeable in characteristic upon change of the value of said force at a rate conforming to a predetermined asymptotic curve and the control effect of said third control means opposing the control effect of said second control means, fourth control means for governing said force changeable in characteristic in proportional response to the value of the characteristic of said first control means and to the resultant control effect of said second and third control means.

24. Control mechanism for controlling a process having a variable condition to be maintained substantially at a control point comprising means operative to regulate flow of energy affecting said process in proportional correspondence with a variable force, apparatus for governing said force including first control means movable in substantially proportional response to said variable condition, spring means, second control means movable in immediate proportional correspondence with change in the value of said force to flex said spring means, third control means movable in accordance with a predetermined asymptotic curve to relieve the flexing of said spring means, fourth control means comprising a control couple of the supply-and-waste valve type one element of which affords a port to the atmosphere and another a valve for said port, the relative positions of said elements governing said force, and being relatively positioned by said first means and by the difference of the positions of the second and third control means.

25. Control apparatus for controlling a process having a condition to be maintained substantially at a control point, comprising regulating means for regulating flow affecting said process, first control means changeable in control effecting characteristic in substantially immediate and continuous proportional correspondence with the value of said condition, second control means operative upon deviation of the condition from the control point and changeable in control-effecting characteristic at a rate proportional to the amount of the deviation, means for operatively and continuously interconnecting said first and second control means with said regulating means to change the setting of said regulating means at a rate proportional to the algebraic sum of the rate of change of said first control means and the rate of change of the second control means, said interconnecting means so continuously interconnecting said first and second control means with said regulating means that its setting is in correspondence with the value of the control-effecting characteristic of said second control means when said condition is at equilibrium at the control point.

CLESSON E. MASON.